Oct. 31, 1939.  B. G. M. MUSELIER  2,177,908
DEVICE FOR CONTROLLING THE CONTENT OF A CARBURETED MIXTURE
Filed Feb. 21, 1938  4 Sheets—Sheet 1

INVENTOR:
BERNARD GABRIEL
MARIE MUSELIER
BY: Alfred Müller
Attorney

Oct. 31, 1939.   B. G. M. MUSELIER   2,177,908
DEVICE FOR CONTROLLING THE CONTENT OF A CARBURETED MIXTURE
Filed Feb. 21, 1938   4 Sheets-Sheet 2
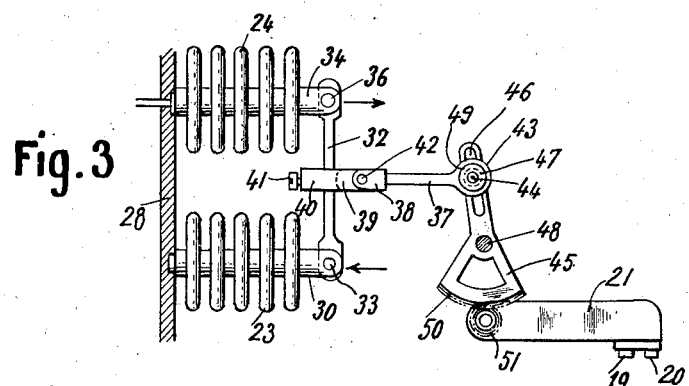
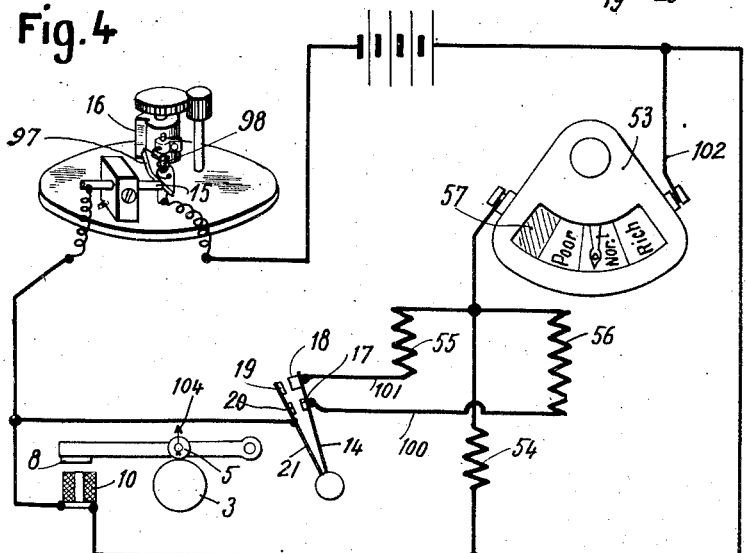
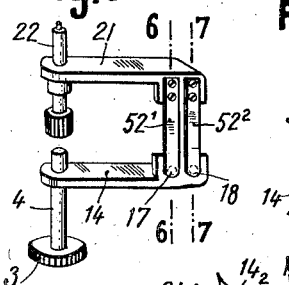
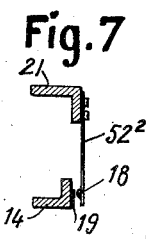
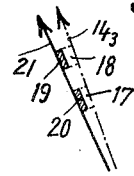
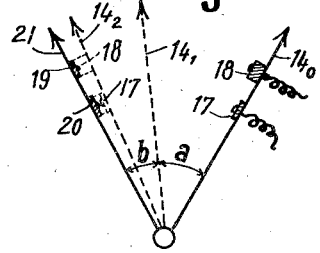
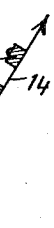
INVENTOR:
BERNARD GABRIEL
MARIE MUSELIER
By: Alfred Müller
Attorney Oct. 31, 1939.     B. G. M. MUSELIER     2,177,908
DEVICE FOR CONTROLLING THE CONTENT OF A CARBURETED MIXTURE
Filed Feb. 21, 1938     4 Sheets-Sheet 3

Oct. 31, 1939.  B. G. M. MUSELIER  2,177,908
DEVICE FOR CONTROLLING THE CONTENT OF A CARBURETED MIXTURE
Filed Feb. 21, 1938   4 Sheets-Sheet 4
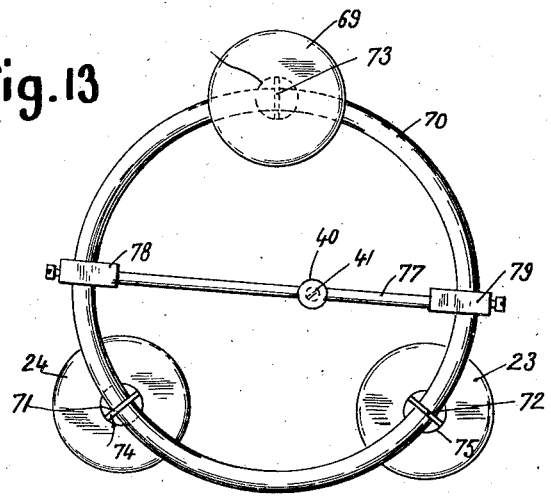
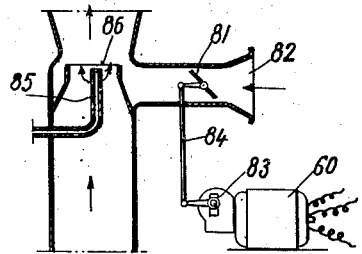
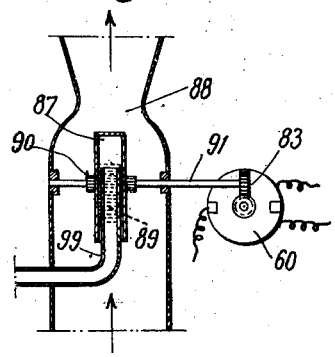
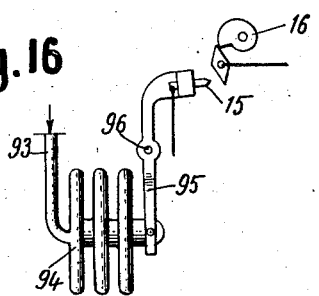
INVENTOR:
BERNARD GABRIEL
MARIE MUSELIER
By: Alfred Müller
    Attorney.

Patented Oct. 31, 1939

2,177,908

UNITED STATES PATENT OFFICE 2,177,908.

DEVICE FOR CONTROLLING THE CONTENT OF A CARBURETED MIXTURE

Bernard Gabriel Marie Muselier, Paris, France

Application February 21, 1938, Serial No. 191,734
In France March 1, 1937

9 Claims. (Cl. 123—119)

This invention relates to improvements in and relating to devices for controlling the content of a carbureted mixture and other applications.

It is known that the number of gramme-molecules of fuel existing in a predetermined volume of a gaseous mixture is inversely proportional to the temperature and proportional to the pressure.

In the carbureted mixtures of the internal combustion engines adapted more particularly for aircrafts, the proportions of fuel and air must be well defined, in order to obtain a complete combustion, while avoiding any excess of air.

This condition involves for each cylinder volume the existence of a number of gramme-molecules of fuel which is inversely proportional to the temperature and proportional to the pressure.

It is known also that the relation between the fuel consumption for each revolution of the engine and the torque developed by the said engine determines the efficiency of the engine as to the energy if the heat capacity of the fuel is known.

The present invention has for its object to provide certain correlations between the characteristic quantities upon which the correct proportions of the constituents of the fuel mixtures depend and more particularly the correlations corresponding to either one or the other of the following forms of execution;

(1) The correlation between the three following main variables: temperature of the gas, absolute pressure of the gas and quantity of fuel for each cylinder volume.

(2) The correlation between both following main variables: torque and quantity of fuel for each revolution of the engine Another object of this invention is to show periodically to the pilot of an airplane whether or not the fuel mixture supplied to the engine is correct.

Still another object of the invention is to control automatically the proportions of the carbureted mixture in function of the main variables: temperature of the gas, absolute pressure of the gas and quantity of fuel for each cylinder volume or charge.

The devices according to the invention permit to obtain the above mentioned objects and the features of the said devices result from the following description and more particularly from the appended claims.

The preferred forms of execution of the invention are shown by way of example in the accompanying drawings, in which:

Figure 3 is a plan view showing the second movable member with its actuating means.

Figure 4 is a diagram showing the electrical connections of an indicating service.

Figure 5 is a partial diagrammatic perspective view showing both movable members and the electrical contacts which are actuated by the said movable members.

Figures 6 and 7 are two sectional views through the lines 6—6 and 7—7 of Figure 5 respectively.

Figures 8 to 10 are diagrammatic views showing the operation of both movable members.

Figure 11:
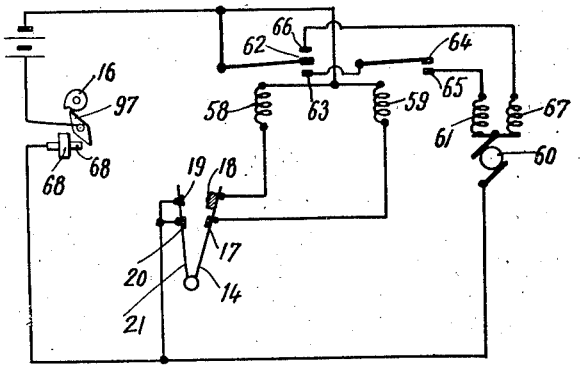

Figure 11 is a diagrammatic view showing the electrical connections of a device for controlling the proportions of the constituents of the carbureted mixtures.

Figure 12:
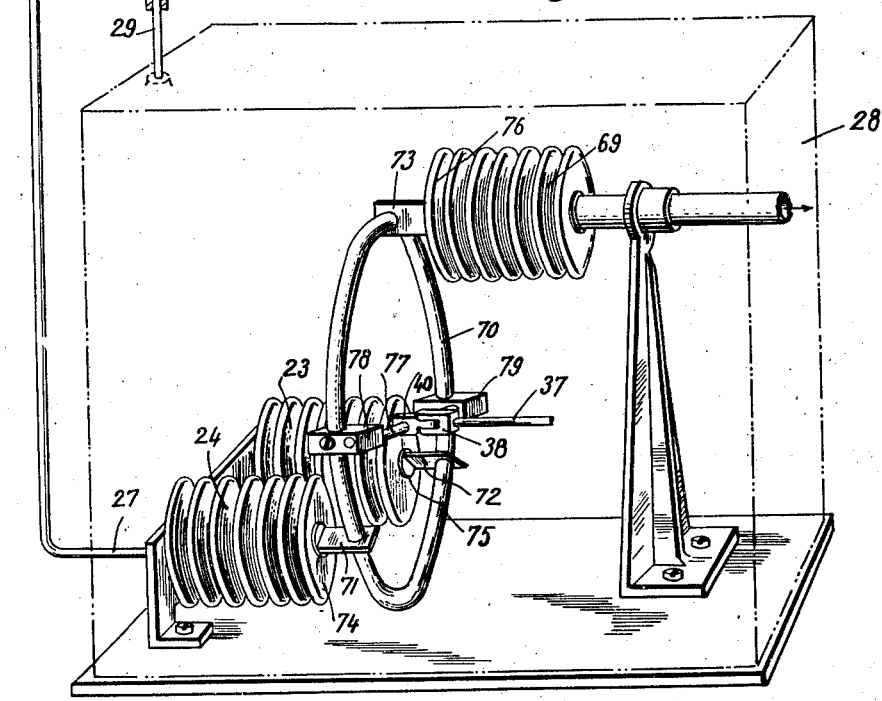

Figure 12 is a plan view showing other means for the actuation of the second movable member.

Figure 13 is a side view corresponding to Figure 12.

Figure 14 is a diagrammatic view showing the means for controlling the admission of air.

Figure 15 is another diagrammatic view showing the means for controlling the admission of the fuel.

Figure 16 is a partial schematical view showing a means for periodically actuating an electrical contact.

Figure 1:
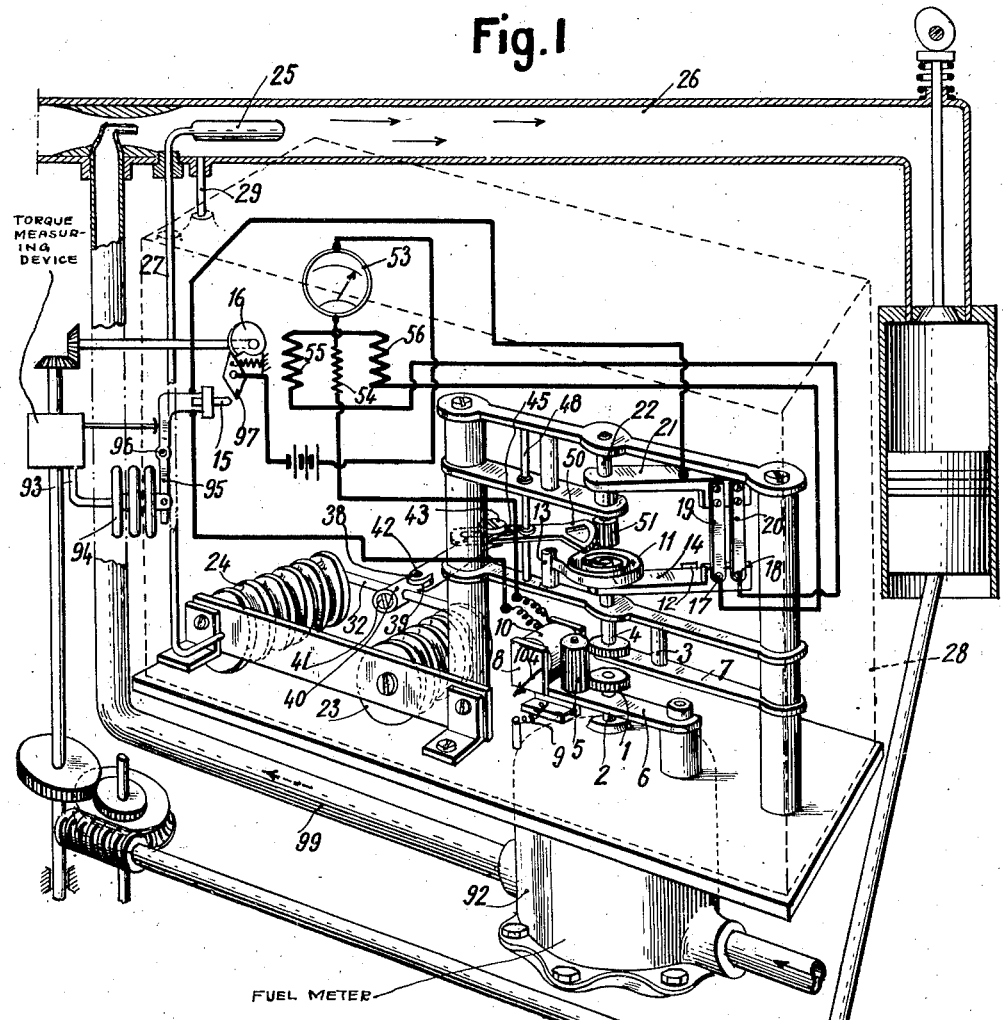
Figure 1 is a plan view showing both movable members as well as the means insuring the displacement of one of the said movable members under the action of the current of fuel.

In the drawings, the device shown in Figure 1 comprises a gear 1 secured on the shaft 2 which projects from the stuffing-box of a meter 92, which is connected to a fuel supplying pipe, as for instance the fuel supplying pipe for the engine in which it is desired to provide for the suitable proportions between the air and the fuel.

Figure 2:
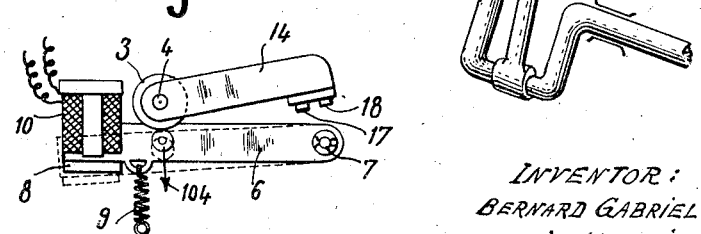
Figure 2 is a plan view showing the means for periodically actuating the movable member under consideration.

A second gear 3 is arranged co-axially with respect to gear 1, the shaft 4 of the said gear 3 being aligned with the shaft 2 of the first named gear 1. On the other hand a pinion 5 is carried by a lever 6 (see Figure 2) pivotally mounted at 7 and on the end of which a vane of soft iron 8 is secured. The said lever 6 can take two positions, one under the action of the return spring 9 and the other under the action of an electro-magnet 10 which is so arranged that it may attract the vane 8.

Owing to this arrangement the gears 1 and 3 are engaged with each other through the medium of the pinion 5 with the rocking lever 6 as soon as the electro-magnet attracts the vane 8.

A spiral spring 11 brings the gear 3 to its initial position again when the said gear is freed from the gear 1.

The axis 4 of the gear 3 is integral with an arm or a lever 14 the initial position of which is determined by a finger 12 carried by the gear 3 and co-operating with a stop 13.

The finger 12 engages the stop 13 when the gear 3 is brought to its initial position again by the spring 11.

The lever 14 forms, therefore, a first movable member which is actuated at a speed which is proportional to the flow of the fuel. This actuation takes place whenever the electro-magnet 10 is energized, that is to say whenever the engine has made a well determined number of revolutions, as will be explained more fully hereinafter.

The second movable member is formed of an arm or a lever 21 mounted on an axis 22 (Figures 1 and 3). This arm 21 takes a position which is a function of the temperature and of the pressure in the suction pipe 26 of the engine. For this purpose a manometric capsule 23 and a thermometric capsule 24 are located in a tight casing 28 which communicates at 29 with the pipe 26 (Fig. 12).

In the manometric capsule 23 the absolute pressure is substantially nil; this capsule is hermetically closed. The interior of the thermometric capsule communicates with a small recipient 25 located in the suction manifold 26 of the engine; this recipient 25 contains a fluid having a comparatively high tension of vapor. It communicates with the thermometric capsule 24 through the medium of a narrow tube 27 filled with a fluid which is inert and has a low tension of vapour (Fig. 3).

The capsules 23 and 24 are provided with bosses 30, 34 respectively, each of which is provided with an axis 33, 36 respectively.

Transmitting means are formed of a lever 32 which engages into slots such as 35 provided in the bosses 34, 30, this lever 32 being pivotally mounted on each of the said axes 33, 36 and assembled in its middle part with a connecting rod 37 by means of a collar 40 provided with a clamping screw 41.

The assembly of the rod 37 and the collar 40 is effected by means of a link-pin 42 and a fork 38 straddling a flat part 39 of the lever 40.

At the other end of the rod 37 (Figure 3) is a flat part 43 the faces of which are parallel to the plane of the drawing.

This flat part 43 is provided with a hole into which the axis 44 engages. The said axis 44 is secured on a rocking lever 45. Owing to the slot-like opening 46 provided in the rocking lever 45. The set-nut 47 by which the axis 44 is secured being loosened, the said axis 44 can slide and it is possible to set it at the suitable distance from the rocking centre 48 of the rocking lever 45. When this setting has been effected, the nut is screwed up again, whereby the edges of the slot-like opening 46 are tightened between the said nut 47 and a shoulder 49 on the axis 44. It is thus possible to adjust the transmission ratio of the said rocking lever 45. The latter is provided with a toothed sector 50 engaging a pinion 51. In this manner, the arm 21 which is integral with the axis of the pinion 51 takes a position the angle of which is an increasing function of the pressure in the suction manifold and a decreasing function of the temperature in the said manifold.

Briefly stated: During each working period the arm 14 departing from an initial position 14 which is always the same (Figure 8) effectuates a momentary angular displacement (a) which is a function of the quantity of fuel flowing during a predetermined number of revolutions of the engine, while the arm 21 takes at every moment an angular position which is a function of the temperature and of the pressure in the suction manifold 26.

The relative position determined by the angle (b) (Figure 8) of both arms 21 and 14 at the end of each periodical displacement of the arm 14 indicates whether the proportion of the fuel in the mixture is correct or not, this correct proportion corresponding to a predetermined relative position of both arms 21 and 14, the arrangement being such that the mixture is too rich or too poor on the one and on the other side of this position respectively.

The periodical actuation of the arm 14 through the shaft 2 of the meter is initiated by the engine itself.

To this end a contact 15 (Figure 4) is periodically closed by a cam 16 operatively connected with the shaft of the engine through a suitable transmission reducing the speed. The said cam 16 rocks the lever 97 about its rocking centre 98, the current being supplied to the said lever 97 at this point 98.

Thus control means are provided which are actuated by the engine, the said control means determining the actuation of the clutching means formed by the lever 6 with the toothed pinion 5. This actuation takes place through the medium of the actuating means formed by the electro-magnet 10.

The contact 15 periodically energizes the electro-magnet 10. This actuation is maintained during a predetermined number of revolutions of the engine.

Thus, the gears 1 and 3 are brought into engagement with each other.

The arm 14 departs from its initial position and accomplishes a stroke which is proportional to the quantity of fuel for each charge. The said stroke being accomplished, the contact 15 is broken and the arm 14 is brought to its initial position again.

This arm 14 carries two contacts 17 and 18 and on the respective trajectories of these contacts are two other contacts 20 and 19 carried by the arm 21.

The operation of the above described device is as follows:

When the arm 14 reaches the end of its stroke, the angular deviation which is produced between the arm 21 and the arm 14 is:

(1) A decreasing function of the pressure,
(2) An increasing function of the temperature,
(3) An increasing function of the quantity of fuel for each charge. When the fuel mixture is too poor, the angle of the arm 14 with respect to the initial position of this arm is smaller than the angle of the arm 21 with respect to its initial position; none of the contacts 17 and 18 engages the contacts 19 and 20 of the arms 21.

When the mixture is too rich, the arm 14 moves away from its initial position in a direction which is such that the angles increase and it closes the contact 18, 19 (position 14₂, Figure 8). Then the arm 14 further advances and closes the contact 17, 20 (Figure 9).

When the mixture is correct, the contact 18, 19 alone is closed, for:

(1) The contact 18 on the arm 14 assumes an angular position which is slightly in advance of the position of the contact 17;

(2) Both angular positions of the contacts 19 and 20 of the arm 21 are identical;

(3) The contact 18 is carried by a flexible blade 52² (Figures 1, 5, 6, 7).

These contacts control two electrical circuits 100—101 (Fig. 4.) which have a common connection 102—103 to which a milli-ammeter 53 is connected which forms the indicating means of the device.

When the mixture is too poor, the milli-ammeter 53 (Figure 4) is supplied with current through the resistance 54 alone. If the mixture is too rich, it is supplied with current through the three resistances 54, 55 and 56 which work in parallel. If the mixture is correct, both resistances 54 and 55 work in parallel.

Thus the pointer of the milli-ammeter 53 can take three positions.

In fact, since the pressure of the source of current is not a constant one, there are three zones of deviation in front of which the indications "too rich", "correct" and "too poor" are written.

In the case of an interruption of the current the pointer of the milli-ammeter takes a position in which it is covered by a mark 57.

Figures 8 and 9 correspond to a given position of the arm 21, i. e. to a predetermined value for the whole of both elements, temperature and pressure.

If these elements vary, the position of the lever 21 (which then takes the position 21₁—Figure 10) varies also. Accordingly the angular displacement (a+b) of the arm 14 is no longer the same as the former displacement.

Many modifications can be made to the device which has been described above by way of example, without departing from the scope of the invention.

More particularly, the said device may be improved so as to automatically control the admission of fuel to the engine. In this case the milli-ammeter 53 is replaced by two relays 58 and 59 (Figure 11). When the mixture is too rich, i. e. when it contains too much fuel, both relays 58 and 59 receive current through the medium of their respective contacts 17, 20 and 18, 19.

This results in the servo-motor in series 60 receiving current through its energizing winding of the left hand side 61, the contacts 62, 63 and 64, 65 of the relays 58 and 59 being then closed.

The said servo-motor 60 actuates either a member which reduces the fuel supply or a member which increases the air supply, or simultaneously two organs, one of which reduces the fuel supply while the other increases the air supply.

If the mixture is correct the relay 58 of the left hand side only receives current and the contact 62, 66 is open. Since the relay 59 of the right hand side is not energized, the contact 64, 65 is in the opening position. The servo-motor 60 receives no current.

When the mixture is too poor, there is no current either on the contact 17 or on the contact 18; the energizing winding 67 of the right hand side of the servo-motor 60 receives current through the medium of the contacts 62, 66 (insured by the return spring of the relay 58).

Since the servo-motor 60 is then energized in a reverse direction, the said servo-motor runs in the reverse direction and actuates either the above mentioned member so as to increase the fuel supply of the other above member so as to reduce the air supply, or both members simultaneously so that the one increases the fuel supply while the other reduces the air supply.

In practice, the airplanes may use various kinds of fuel. For this reason it is advised to take the fact into account that the proportions of fuel in the mixtures which are supplied to the cylinders may vary according to the desires of the users.

In order to facilitate such modifications, the contact holder 68 may be advanced or retracted by means of a control which can be manipulated during the flight. In this case any other device could be used which would permit to vary the number of revolutions of the engine during the flight, that is the number of revolutions during which the current is established in the electromagnet 10, and, in a general manner, the ratio between the quantity of fuel for each charge and the stroke of the arm 14.

Likewise, it would be possible to vary the transmission ratio between the movements of the capsules and the movement of the arm 21 without departing from the scope of the present invention.

Of course, other corrective members could be provided in the above described device, the movement of the said members being then added to or subtracted from or generally combined with the movement of the thermometric capsule 24 and the manometric capsule 23, without a departure from the spirit and scope of the invention.

More particularly, actuating means formed of a second manometric capsule 69 (Figure 12) which is sensitive to the atmospheric pressure can produce an effect which is added to the effect of the manometric capsule 23 and of the thermometric capsule 24.

To this end the interior of the said capsule 69 (Figure 12) communicates with the atmosphere and its action is a reversed one because of its reversed mounting.

The lever 32 is then replaced by a ring 70 provided with three flat projections 71, 72 and 73 of the three capsules 23, 24 and 69. These projections are formed of yielding blades which can yield laterally.

A cross piece 77 is secured at two points which are diametrically opposed and adjustable on the ring 70 through two collars 78 and 79.

The actuating rod 37 is secured at a point which is adjustable on the cross piece 77. This rod 37 actuates the same pieces as the rod 37 in the preceding examples.

It is also possible, without a departure from the scope of the invention, to combine the forces and in a general manner the actions of the various capsules 23, 24 and 69 and thus to obtain a resulting displacement which corresponds to the desired law.

According to this invention, the above mentioned means for controlling the air supply may comprise a throttle valve or butterfly valve 81 (Figure 14) which controls the supply of additional air entering at 82. The mechanical connection between the motor 60 and the said valve 81 is obtained by means of a speed reducing gear 83 and a bell crank lever 84; 85 designates the nozzle of the carbureter and 86 the Venturi throttle of the said carbureter.

According to another embodiment of the invention the means for controlling the fuel supply may comprise a jet 87 (Figure 15) movable in the axis of the venturi of the carbureter so as to bring the same nearer to or remove it from the most throttled part 88 of the Venturi tube.

This jet 87 is slidably mounted on the fuel supply pipe 99. It is provided with a rack 89 engaged by the pinion 90, the said pinion 90 being actuated by the motor 60 through the medium of the speed reducing gear 83 and the transmission shaft 91.

Of course, other controlling means actuated by the motor 60 could be used as well. Lastly and without a departure from the scope of the present invention, the deviation of the arms 21 and 14, instead of being used for opening and closing contacts, could be used for opening or closing ports through which a fluid is discharged, the said fluid actuating by means of a piston the members which control the proportions of air and fuel in the fuel mixture.

According to another feature of this invention, the arm 21 can be actuated so as to automatically take a position which is a function of the torque developed by the engine. To this end a torque measuring device is provided in which a pressure is created which is proportional to the said torque. The said pressure can be established inwardly of a manometric capsule such as 23; then the capsule 24 may be replaced by a fixed piece the length of which can be adjusted.

According to this embodiment the contact-stop 15 can be shifted and adjusted so that the angle of rotation of the engine during which the contact is established by the said stop is inversely proportional to the heat capacity and also inversely proportional to the efficiency which is known as corresponding to the altitude and the number of revolutions at and with which the engine runs. Of course, also other embodiments could be devised provided that the arm 21 and the contact-stop 15 are controlled by data which are chosen among the following three data: torque, heating capacity, energetic efficiency and so that each of the said variables has or has not an automatic action either on the final position of the arm 21 or on that of the arm 14.

More particularly, the pressure which is created by the torque measuring device can act by means of a pipe 93 on a manometric capsule 94 coupled with the contact-stop 15 (Figure 16) so that the current is established on the contact-stop 15 during an angle of rotation of the engine which is inversely proportional to the torque of the said engine or, which is the same, so that the current is established during a period of time which corresponds to a predetermined and constant operation of the torque of the engine.

The capsule 94 which forms the means for the subjection to the driving torque actuates the contact 15 by means of a lever 95 pivotally mounted at 96.

In this case, the arm 14 takes successive operative positions which correspond to the volume of fuel—in a liquid condition—which is consumed for effecting the above described constant work.

The arm 21 is then adjusted in a position which corresponds to the product of the energetic efficiency of the engine by the heat capacity of the fuel volume unit in a liquid condition.

I claim:

1. In a device for controlling the content of a carbureted mixture supplied to an engine: a first rocking lever, temporarily actuating means operated by the engine for displacing said lever in function of the flow of the fuel, a second rocking lever, means for periodically rocking said second lever in function of the temperature and the pressure of the carbureted mixture, means for indicating the angular deviation of the said two rocking levers at the end of each rocking period of the said first rocking lever.

2. In a device for controlling the content of a carbureted mixture supplied to an engine, a first rocking lever, temporarily actuating means for determining the duration of the displacement of the said first rocking lever, a fuel meter, clutching means controlled by the engine for periodically clutching the said first rocking lever with said meter, a second rocking lever, means for displacing said second lever in function of the temperature and the pressure of the carbureted mixture, means for indicating the angular deviation of the said two rocking levers at the end of each rocking period of the said first rocking lever.

3. In a device for controlling the content of a carbureted mixture supplied to an engine, a first rocking lever, a toothed pinion integral with said first rocking lever, means for determining the duration of displacements of the said first rocking lever, a fuel meter, a toothed pinion actuated by said meter, a movable equipment comprising a toothed pinion, actuating means periodically controlled by the engine for rocking said movable equipment and engaging the toothed pinion of said movable equipment with the said two other pinions, a second rocking lever, means for displacing said second rocking lever in function of the temperature and pressure of the carbureted mixture, means for indicating the angular deviation of the said two rocking levers at the end of each rocking period of the said first rocking lever.

4. In a device for controlling the content of a carbureted mixture supplied to an engine, a first rocking lever, a toothed pinion integral with said first rocking lever, a fuel meter, a toothed pinion actuated by said fuel meter, a movable equipment comprising a toothed pinion, an electro-magnet attracting said movable equipment for rocking the same and engaging the toothed pinion of said movable equipment with the said two other pinions, a contact periodically actuated by the engine and closing the circuit of the said electro-magnet during a regulatable period, a second rocking lever, means for displacing said second lever in function of the temperature and pressure of the carbureted mixture, means for indicating the angular deviation of the said two rocking levers at the end of each rocking period of the said first rocking lever.

5. In a device for controlling the content of a carbureted mixture supplied to an engine, a first rocking lever, means controlled by the engine for periodically displacing said rocking lever in proportion to the flow of the fuel, a second rocking lever, a thermometric capsule subject to the action of the temperature of the carbureted mixture, a manometric capsule subject to the action of the pressure of the carbureted mixture, transmitting means interposed between the said second rocking lever and the said manometric capsules, and means for indicating the angular deviation of the said two rocking levers at the end of each rocking period of the said first rocking lever.

6. In a device for controlling the content of a carbureted mixture supplied to an engine, a first rocking lever, means controlled by the engine for periodically rocking said rocking lever in proportion to the flow of the fuel, a second rocking lever, a manometric capsule subject to the action of the temperature of the carbureted mixture, a manometric capsule subject to the action of the pressure of the said carbureted mixture, an armature connecting the movable ends of the said two manometric capsules, a system comprising a connecting rod and a lever interposed between the said armature and the said second rocking lever, and means for indicating the angular deviation of the said two rocking levers at the end of each rocking period of the said first rocking lever.

7. In a device for controlling the content of a carbureted mixture, a first rocking lever, means controlled by the engine for periodically displacing said rocking lever in proportion to the flow of the fuel, a second rocking lever, a manometric capsule containing a dilatable transmitting fluid subject to the action of the temperature of the carbureted mixture, a manometric capsule empty of any fluid and surrounded outwardly by a fluid under the same pressure as the carbureted mixture, transmitting means interposed between the said second rocking lever and the said two manometric capsules, and means for indicating the angular deviation of the said two rocking levers at the end of each rocking period of the said first rocking lever.

8. In a device for controlling the content of a carbureted mixture supplied to an engine, a first movable member, means actuated by the engine for periodically displacing said member in function of the flow of fuel, a second movable member, means for displacing said second movable member in function of the temperature and of the pressure of the carbureted mixture, and means actuated in function of the relationship between said movable member at the end of each displacement of the first mentioned member to regulate the fuel mixture.

9. In a device for controlling the content of a carbureted mixture supplied to an engine, a first movable member, means actuated by the engine for periodically displacing said member in function of the flow of fuel, a second movable member, means for displacing said second movable member in function of the temperature and of the pressure of the carbureted mixture, and means to indicate the position relative to each other of said members at the end of each displacement of the first mentioned member.

BERNARD GABRIEL MARIE MUSELIER.